United States Patent [19]

Bush et al.

[11] 4,404,339

[45] Sep. 13, 1983

[54] SUSPENSION POLYMERIZATION PROCESS FOR MAKING VINYL RESINS FOR USE IN PLASTISOLS

[75] Inventors: Charles N. Bush, Bay Village; Thomas J. Doyle, Lorain, both of Ohio

[73] Assignee: The B. F. Goodrich Company, Akron, Ohio

[21] Appl. No.: 84,479

[22] Filed: Oct. 15, 1979

[51] Int. Cl.³ .............................................. C08F 2/20
[52] U.S. Cl. .................................... 526/88; 524/148; 524/297; 526/344.2
[58] Field of Search .......................................... 526/88

[56] References Cited

U.S. PATENT DOCUMENTS 3,682,877 8/1972 Czekay et al. ........................ 526/88
4,136,242 1/1979 Koyanagi et al. ..................... 526/88

FOREIGN PATENT DOCUMENTS 1393678 5/1975 United Kingdom .......... 526/88 UX

*Primary Examiner*—Stanford M. Levin

*Attorney, Agent, or Firm*—Joe A. Powell; Alan A. Csontos

[57] ABSTRACT

This invention relates to the suspension polymerization of vinyl halides and vinylidene halides in an aqueous medium to make polymers and copolymers which are designed for use in making plastisols. The process is conducted in an aqueous medium using a free-radical yielding catalyst, and in the presence of a hydrolyzed polyvinyl acetate (polyvinyl alcohol) having a degree of hydrolysis in the range of about 65% to about 85% and a compound having a hydrophile-lipophile balance (HLB) less than about 3.5. The important aspect of the present new process is the use of agitation ramping, that is, changing the degree of agitation during the course of the reaction, and adding the catalyst to the reaction medium after the same has reached the reaction temperature whereby these are produced polymer particles which are dense spherical glassy beads having an average diameter in the range of about 10 to about 100 microns. The suspension resins so produced are easily and uniformly mixed with a plasticizer to form plastisols which are stable, containing particles of uniform and proper size, and capable of producing films, and like products, of good clarity.

13 Claims, No Drawings

SUSPENSION POLYMERIZATION PROCESS FOR MAKING VINYL RESINS FOR USE IN PLASTISOLS

BACKGROUND OF THE INVENTION

Vinyl resins, such as polyvinyl chloride (PVC) and certain copolymers of vinyl halides, represent a highly versatile class of synthetic resins which can be processed by various methods into a myriad of useful end products. In order to facilitate end-use processing, it is the usual practice in the art to design the vinyl resins for use in specific processing techniques. As a result, such designing necessarily requires adjusting the balance of the vinyl resin properties in order to enhance those which are desirable or necesssary for the intended end use of the particular vinyl resin being made.

It is known that vinyl resins may be plasticized or changed from the hard, horny and stiff state to a soft, plastic workable condition by the addition thereto at elevated temperatures of certain plasticizers, such as dioctyl phthalate, for example. When the vinyl resin is so mixed or blended with a plasticizer, it is referred to as a "plastisol" and by virtue of the flowability thereof, it can be processed into various useful products, such as molded products, coatings, and the like. The vinyl resin must be capable of being mixed with a plasticizer easily and uniformly to form low viscosity plastisols which are stable, containing particles of uniform and proper size, and capable of producing films and like products, of good clarity. It is often desirable to maximize the ability of the vinyl resins to absorb and/or to adsorb plasticizers in order to facilitate and increase their use in the manufacture of certain end products, such as, for example, flexible films and sheeting, and particularly for use in the flooring or floor-covering industry.

Various processes have heretofore been prepared and employed in order to attain vinyl plastisol resins with high plasticizer capacity and having increased flexibility, workability and dispensibility. Chief among these processes have been the customary emulsion polymerization processes. However, suitable plastisol resins have been difficult to obtain via this route since the latices produced thereby contain polymer particles of varying size, the majority of which are either too fine or too large. The aqueous suspension polymerization technique has been employed in making vinyl plastisol resins or polymers but the same has resulted in the generation of very fine resin particles or "fines" which results in the inconvenient and detrimental creation of polymer dust. These fines hamper the pneumatic bulk handling of the vinyl resins and also create potential health hazards, that is, enough of the fines pass out in the plant effluent to put said plant out of compliance with the Environmental Protection Agency (EPA) requirements. More importantly, from a technical and business point of view, the use of many of the prior processes in making vinyl plastisol resins has resulted in drastic losses in the bulk density and heat stability of the resins, which in turn makes them unsuitable for many end uses and creates costly problems in handling and storage of such resins.

Accordingly, there is a need in the art for a process for producing vinyl plastisol resins which overcomes the aforementioned difficulties and is a convenient, inexpensive process which produces resins which retain the desirable properties ordinarily found in conventional or general purpose resins.

SUMMARY OF THE INVENTION

The present invention relates to the suspension polymerization of vinyl monomer(s) in an aqueous medium to form vinyl resins which are designed for use in making plastisols. The process is conducted in an aqueous medium using a free-radical yielding polymerization catalyst or initiator, at a temperature in the range of about 30° C. to about 70° C., in the presence of a hydrolyzed polyvinyl acetate (polyvinyl alcohol) as a suspending agent having a degree of hydrolysis in the range of about 65% to about 85%, and a surfactant having a hydrophile-lipophile balance, or HLB, less than about 3.5. The important aspect of the present new process is the use of agitation ramping, that is, changing the degree of agitation during the course of the reaction, and adding the catalyst or initiator to the reaction medium after the same has reached the reaction temperature whereby there are produced polymer particles which are dense spherical glassy beads having an average diameter in the range of about 10 microns to about 100 microns. The suspension resins so produced are easily and uniformly mixed with a plasticizer to form plastisols which are stable, containing particles of uniform and proper size, and capable of producing films, and like products, of good clarity.

DETAILED DESCRIPTION

In the present invention "vinyl resins" or "vinyl plastisol resin" refers to polymers and copolymers of vinyl and vinylidene halides, such as vinyl chloride, vinylidene chloride, and the like. The vinyl halides and vinylidene halides may be copolymerized with each other or with one or more other vinylidene monomers having at least one terminal $CH_2{=}C{<}$ grouping. As examples of such vinylidene monomers may be mentioned the $\alpha,\beta$-olefinically unsaturated carboxylic acids, such as acrylic acid, methacrylic acid, ethacrylic acid, $\alpha$-cyanoacrylic acid and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles, such as acrylonitrile and methacrylonitrile, acrylamides, such as methyl acrylamide, N-methylol acrylamide, N-butoxy methacrylamide, and the like; vinyl ethers, such as ethyl vinyl ether, chloroethyl vinyl ether, and the like; the vinyl ketones; styrene and styrene derivatives including $\alpha$-methyl styrene, vinyl toluene, chlorostyrene, and the like; vinyl naphthalene, allyl and vinyl chloroacetate, vinyl acetate, vinyl pyridine, methyl vinyl ketone, and other vinylidene monomers of the types known to those skilled in the art. The present invention is particularly applicable to the manufacture of vinyl plastisol resins made by the suspension polymerization of vinyl chloride or vinylidene chloride alone or in admixture with one or more vinylidene monomers copolymerized therewith in amounts as great as about 80% by weight, based on the weight of the monomer mixture. The most preferred vinyl plastisol resin is polyvinyl chloride (PVC) and the invention, for simplicity and convenience, will be described in connection therewith, it being understood that this is merely intended in an illustrative and not a limitative sense.

The principle object of the present invention is to produce dense, spherical beads or particles of vinyl resins of the proper size which give the resins the proper bulk density and make them most desirable in making plastisols. Usefulness of a resin in plastisol applications is determined, to a large degree, by the physical structure of its component particles. The important parameters of such vinyl resins are mean particle size and size distribution, particle density as determined by porosity, particle shape, and degree of agglomeration. The present process produces vinyl plastisol resins which meet all these parameters, each of which is in the desired measurement range resulting in the production of end-products having superior properties.

The particle size distribution of vinyl resins can be measured by Coulter-counter in water or by the Micromeretics sedigraph in a plasticizer. Either method gives the mean particle diameter as well as the distribution of the particle sizes. Most measurements employed herein, in connection with the specific examples, were made by Micromeretics and are reported as the mean diameter ($d_{50}$) in microns. In the present invention, the average particle size ranges from about 10 microns to about 100 microns, with a distribution of particle sizes in the range of about 1 micron to about 140 microns. The most useful range of average particle size is from about 15 microns to about 90 microns with a quite narrow particle size distribution. With respect to the procedures and equipment used above, the Coulter Counter is described in "Particle Size Measurement" by T. Allen in Chapter 13, 2nd Edition, published in 1975 by Chapman and Hall, London, and the Micromeretic Sedigraph is described in a paper by C. A. Daniels submitted and presented at the "ACS National Meeting" in Anneheim, California in 1978.

The shape of the vinyl resin particles, that is, whether spherical or non-spherical, is determined from both light and Scanning Electron Micrograph (SEM) photomicrographs. The degree of distortion from the spherical is readily seen, as well as any agglomeration of the polymer particles. In the light microscope, wherein the resin particles are immersed in a plasticizer, such as dioctyl phthalate, porosity is easily seen as black particles or areas. It has been found that this data is in good qualitative agreement with porosimeter data. By distortion, as stated above, relates to particles of suspension vinyl resins which can be seen, under the microscope, to be shaped like a cup, that is, the resin particles have one or more indentations on the surface which gives the appearance of a cup-shaped particle. This indentation on the surface results from a collapse during polymerization to accomodate the large density change in going from a monomer droplet to a solid resin particle. The disadvantage of these odd-shaped or cup-shaped particles is that they show very poor packing and will not produce a satisfactory pourable plastisol at the level of plasticizer normally employed in commercial operations.

The porosity of the vinyl resin particles is measured by mercury intrusion. While the microscope can provide visual qualitative data with respect to the porosity of resins, it cannot provide quantitative data. On the other hand, Mercury Intrusion porosimetry gives a quantitative value for porosity and this method was employed in testing the vinyl plastisol resins of the present invention. In this respect, reference is made to ASTM D 2873-70 which is a special adaptation of the Mercury Intrusion technique for the measurement of PVC pore volumn. See also "Encyclopedia of PVC," published by Marcel Dekker, Inc. of New York, Vol, 1, pages 204–206. The porosity of the resins of the instant invention is usually in the range of about 0.01 cc/gm to about 0.10 cc/gm, whereas the usual commercial vinyl resins, such as PVC, will have a porosity of 0.2 cc/gm or higher. These figures show the dense particles that are obtained with the present invention.

Another important parameter in the usefulness of vinyl resins in plastisol applications is the bulk density of the resin. A very valuable test for characterizing the vinyl plastisol resins is the settled bulk density in water. From this test, one can calculate (1) the average particle density, which is another measure of porosity; (2) the packing fraction, which measures the geometry of packing, which in turn is a function of particle shape and size distribution; and (3) the settled bulk density. The settled bulk density is an accurate predictor of plastisol viscosity which is not surprising since it combines the elements of density and packing fraction in one parameter. The procedure employed for determining the settled bulk density of the vinyl resins was as follows: (1) weight out 80 grams of dried resin into a 500 ml. beaker; (2) add 5 drops of 1% sodium lauryl sulfate to 400 ml. of distilled water; (3) add (2) to (1) slowly while stirring until the resin is wetted and pourable, using no more water than necessary to get a fluid suspension; (4) transfer the resin slurry to a weighed 250 ml. graduate, (5) add a few drops of an antifoaming agent and weigh graduate and slurry; (6) cover graduate and let it settle for 16–24 hours; and (7) measure volume of settled resin. The following calculations are then made:

$$\frac{\text{Resin Weight}}{\text{Settled Volume}} = \text{Settled Bulk Density (gm/cc.)} \quad \text{A.}$$

$$\frac{\text{Resin Weight}}{\text{Resin Volume}_{(1)}} = \text{Average Particle Density} \quad \text{B.}$$

$$\frac{\text{Settled Bulk Density}}{\text{Average Particle Density}} = \text{Packing Fraction} \quad \text{C.}$$

The settled bulk density, or bulk density, as referred to in the specific examples hereinafter, of the vinyl plastisol resins of the present invention will be in the range of about 0.6 gm/cc to about 0.82 gm/cc. The most preferred resins will have a bulk density in the range of about 0.72 gm/cc, to about 0.82 gm/cc.

One of the most important or critical features of the present invention is the use of a proper catalyst or initiator, which affects or determines the temperature and time of the reaction and the time of the catalyst addition to the reaction medium. Further, and most importantly, the catalyst is added to the polymerization medium after the same has been raised to the reaction temperature. This timing of catalyst addition, in combination with agitation ramping and the proper recipe, as discussed hereinafter, results in the production of the dense spherical vinyl plastisol resin particles desired.

Normally, in the suspension polymerization of a vinyl monomer or monomers, the catalyst or initiator can be added to the polymerization medium at any time, provided that the temperature is kept below the temperature of reactivity of the particular catalyst, or catalysts, during addition in order that the reaction is not started prematurely. However, this alone will not produce the dense spherical vinyl resin particles which result from the practice of the present invention.

In addition to the timing of the addition of the catalyst or initiator, it is necessary to choose the proper catalyst or initiator which affects or determines the temperature and time of the reaction. Also, the selection of the catalyst will be dependent upon the molecular weight desired in the finished polymer or resin. Further, the temperature of the reaction largely determines the molecular weight.

The catalyst or initiator employed in the present invention is a monomer-soluble, that is, an oil-soluble, catalyst or free radical initiator having low water-solubility, which may be an azo or peroxy compound such as, for example, azo-bis-isobutyronitrile, 2,2'-azo-bis(2,4-dimethylvaleronitrile), tert-butyl peroxypivolate, lauroyl peroxide, caproyl peroxide, benzoyl peroxide, diisononoyl peroxide, bis(2,4-dichlorobenzoyl) peroxide, bis(orthomethyl benzoyl) peroxide, dicetyl peroxydicarbonate, isopropylperoxy dicarbonate, di-secondary butyl peroxydicarbonate, dinormal propyl peroxydicarbonate, bis(4-tert-butyl cyclohexyl)peroxydicarbonate, di(2-ethyl hexyl)peroxydicarbonate, and the like. In the present process the selected catalyst or initiator should be present in the polymerization medium in an amount in the range of about 0.01% to about 0.5% by weight, based on the weight of monomer(s) being polymerized. It has been found, after repeated experimentation, that an amount of catalyst in the range of 0.04% to 0.2% by weight gives extremely satisfactory results, not only in the polymerization reaction, but also in the finished product, or vinyl resin produced.

Another important or critical feature of the present invention is agitation ramping, that is, changing the degree of agitation during the course of the reaction. It has been found that by using agitation ramping the mean diameter of the polymer particle drops to a level where the fineness of a plastisol made from such polymer or resin is greatly improved and more acceptable to the industry. Agitation ramping, as employed herein, involves stirring or agitating the polymerization reaction mixture at a high RPM (Revolutions per minute) during the early stages of the reaction and then lowering the RPM for the duration of the polymerization reaction. The high RPM in the early part of the polymerization reaction results in a small monomer(s) droplet size. However, once the polymer skins have formed, the particles of polymer become sensitive to the high shear in the system and continuation of the high RPM beyond a certain maximum percent of conversion results in distorted and/or shredded particles. On the other hand, employing the agitating ramping of the present invention, and reducing the agitation RPM to a safe level before said maximum percent of conversion or when such conversion is reached, the spherical polymer particle structure will be maintained throughout the duration of the polymerization reaction. We have found that the maximum conversion, above referred to, will be about 10%, and normally will be attained in about ¼ to about 2 hours. Of course, in many instances, the agitator RPM will be changed or ramped prior to reaching the said maximum conversion. The agitator RPM during the first stage of polymerization up to said maximum conversion will be in the range of about 100 RPM to about 450 RPM. In the second stage, or throughout the remainder of the reaction, the agitator RPM will be in the range of about 50 RPM to about 300 RPM. While the above RPM ranges overlap, the RPMs chosen will not be the same in each stage. The RPM in the first stage, or beginning of the reaction, is always greater than the RPM in the second stage. It is to be understood, of course, that the particular RPM's chosen from the ranges given will depend in great measure upon the size of the reactor, the temperature of the reaction, and the particular catalyst or catalysts used. For example, the larger the reactor the lower will be the RPMs chosen. In large reactors, such as a 5,000 gallon reactor, for example, the agitator shaft can be rotated at a slower speed and still achieve the necessary agitation or mixing.

In addition to the agitation ramping during the polymerization reaction, it is necessary to have the proper agitation, or shear, prior to the start of the polymerization reaction. Generally, a monomer(s) premix is formed containing the recipe ingredients, with the exception of the catalyst, and the same is thoroughly mixed with sufficient shear action to dispose the monomer(s) in the reaction medium in the form of tiny droplets. The droplets should be of such size that when transformed into polymer particles the same will be of the desired size, that is, within the range of about 10 microns to about 100 microns in average diameter.

The molecular weight of the vinyl resin is important since it controls the strength of the fused particle, that is, after the vinyl resin has been formed into a shaped article from the vinyl resin plastisol. Molecular weight is measured by inherent viscosity (IV) and one of the factors which determines molecular weight of the vinyl resin or polymer is the temperature at which the polymerization of the monomer(s) takes place. The temperature of the reaction in the present process will normally be in the range of about 30° C. to about 70° C. Satisfactory results are obtained when the temperature of reaction is in the range of about 45° C. to about 60° C. The time of the reaction will vary considerably depending upon the monomer(s) being polymerized, the catalyst(s) used, temperature, etc., but normally the time of reaction will be from about 6 hours to about 12 hours.

The critical aspects of the present invention, namely, catalyst addition and agitation ramping, produce improved dense, spherical beads of polymer or copolymer having the desired particle size and distribution when certain specified materials are present in the polymerization medium. The materials referred to are (1) a proper suspending agent or dispersant and (2) a proper surfactant. Not all compounds falling within these classes of materials will produce the superior vinyl plastisol resins of the present invention.

The suspending agents or dispersants useful in the instant invention are the polyvinyl alcohols or hydrolyzed polyvinyl acetate (PVA) having a degree of hydrolysis in the range of about 65% to about 85%. The most preferred polyvinyl alcohol is one consisting of 72.5% hydrolyzed PVA. There can also be used in the present invention mixtures of PVA's having different degrees of hydrolysis so long as the ratio of the different PVA's is such that the average degree of hydrolysis is in the range of about 65% to about 85%. For example, a mixture of 50% by weight of 72.5% PVA and 50% by weight of polyvinyl alcohol consisting of 88% hydrolyzed PVA is satisfactory. It is to be understood that the herein described suspending agents apply only to the present improved process, utilizing critical catalyst addition and agitation ramping, where such suspending agents are employed in combination with certain nonionic surfactants, as described below.

The suspending agent or dispersant is employed in the polymerization mixture or medium in an amount in the range of about 0.5% to about 1.5% by weight, based on the weight of the monomer(s) being polymerized. Usually an amount in the range of about 0.75% to about 1.5% by weight is used to obtain the most satisfactory properties in the finished vinyl resins. The dispersant may be added to the reaction medium in the reactor at any time prior to agitation to form the discrete droplets of monomer(s) to be polymerized and prior to the start of the reaction. Usually, however, the dispersant is added to the water or aqueous reaction medium in the reactor and agitated prior to the addition of the monomer(s).

The surfactant used, in conjunction with the above-described polyvinyl alcohol, is one which is nonionic and hydrophobic and has an HLB (hydrophile-lipophile balance) less than about 3.5. Preferably, the HLB of the surfactant should be less than about 2.5. In fact, the lower the HLB of the surfactant the better, that is, the more water-insoluble the surfactant is, the better are the desired properties in the finished vinyl resins and their use in making plastisols with superior properties.

The efficiency of nonionic surfactants or surface active agents is related to the polarity of the molecule, that is, the relation between the contribution of the polar hydrophilic head and the non-polar lipophilic tail. This polarity for nonionic surfactants is defined in terms of an empirical quantity which is called the hydrophile-lipophile balance or HLB, as referred to above. The HLB is explained and the method of determining the same is set out in "Nonionic Surfactants" edited by Martin J. Shick at pages 604–612, published in 1967 by Marcel Dekker, Inc., New York. The amount of surfactant used in the present process is in the range of about 0.1% to about 1.5% by weight, based on the weight of the monomer(s) to be polymerized. More than one surfactant may be employed in the polymerization mixture so long as the combined HLB of the surfactants does not exceed 3.5. For example, two surfactants, each of which has an HLB of 1.0, can be used satisfactorily. The most beneficial results are obtained when the surfactant(s) is employed in the range of about 0.25% to about 1.0% by weight. It should be pointed out that the surfactants used herein have a synergistic effect with the polyvinyl alcohol dispersant which results in more spherical, better formed particles of resin which are smaller with a narrowed particle size distribution. When used in combination with the catalyst addition and agitation ramping of the present invention, the combination of dispersant and surfactant described herein is important in achieving the desired superior results of the present invention.

The nonionic surfactants having the proper HLB as described above, are those falling within the classes of polyoxyethylene esters of fatty acids, fatty esters and ethoxylated fatty esters of polyols, aromatic and aliphatic esters of long chain alcohols containing more than 7 carbon atoms, epoxidized triglycerides, block copolymers of polyoxyethylene and polyoxypropylene, polyoxyethylene ethers, ethoxylated alkyl phenols, ethoxylated amines, and the like. As examples of suitable surfactants there may be named glycerol trioleate, ethylene glycol distearate, sorbitan trioleate, epoxidized soy bean oil, dioctyl phthalate, sorbitan tristearate, ethylene glycol trioleate, sorbitan trioleate, diethylene glycol monolaurate, acetylated sucrose fatty ester, liquid vegetable and animal fats and oils, and the like. There also may be named liquid aliphatic hydrocarbons with low water-solubility, for example, $C_{12}$ to $C_{30}$ compounds either pure or mixed, liquid esters with high enough molecular weight to have low water solubility, high molecular weight chlorinated hydrocarbons, high molecular weight alcohols, such as those of 8 carbon atoms or more, and the like. Numerous other nonionic surfactants having the proper HLB factor will be apparent to those skilled in the art.

The surfactant can be added to the reaction medium in the reactor at any time prior to the start of the polymerization reaction. However, it is usually added to the water or aqueous reaction medium in the reactor along with the dispersant and prior to the addition of the monomer(s).

As has been pointed out herein, the resins or polymers of the present invention are suspension vinyl plastisol resins since they are designed primarily for use in plastisols. Plastisols are made with the instant suspension resins by uniformly blending or intimately mixing, by conventional means, with 100 parts by weight of the suspension resin, from about 30 to about 100 parts by weight of one or more plasticizers. The useful plasticizers may be described as the alkyl or alkoxy alkyl esters of dicarboxylic acids or the esters of a polyhydric alcohol and a monobasic acid. As examples of such materials there may be named dibutyl phthalate, dioctyl phthalate, diallyl phthalate, dibutyl sebacate, dinonyl phthalate, di(2-ethyl hexyl) phthalate, di(2-ethyl hexyl) adipate, dilauryl phthalate, dimethyl tetrachlorophthalate, butyl phthalyl butyl glycollate, glyceryl stearate, and the like. Other plasticizers, known to those skilled in the art, may likewise be employed. The preferred plasticizers are the liquid diesters of aliphatic alcohols having from 4 to 20 carbon atoms and dibasic carboxylic acids having from 6 to 14 carbon atoms.

While the vinyl resins of the present invention are used alone in making plastisols, there are many applications of the finished plastisols where it is desirable to blend another resin with the vinyl resin produced herein in order to obtain certain desirable properties in articles made therefrom. The properties referred to are such things as tensile strength, gloss, and the like. It has been found that excellent results are obtained when employing vinyl resin blends containing from about 10 parts to about 95 parts by weight of the vinyl resin of the present invention and from about 5 parts to about 90 parts by weight of a regular resin, such as PVC, having a particle size in the range of about 0.3 to about 5.0 microns in diameter. The regular resins used for such blending purposes will not necessarily be in the form of dense, spherical particles, as is the case with the vinyl resin produced in accordance with the instant invention. Preferred resin blends are those containing from 40 parts to 90 parts by weight of the vinyl resin produced herein and from 10 parts to 60 parts by weight of a regular resin. While it is not necessary, usually the regular resin will be a dispersion resin made from one or more vinyl and vinylidene halides using the emulsion polymerization process.

The plastisols made from the suspension vinyl resins of the present invention should have the desired yield and preferably, with little or no dilatancy. Yield is simply defined as resistance to flow and is normally determined numerically through viscosity measurements employing well known standard techniques. Normally such values are arrived at by calculation from viscosity measurements using a Brookfield Model RVF Viscometer according to ASTM method D1824-61T. Yield is determined from viscosity measurements of the plastisols at varying r.p.m.'s (revolutions per minute) after initial preparation and at intervals of aging. The viscosity is measured in centipoises (cps.) at a temperature of 23° C. In the specific examples that follow hereinafter, and in the data set out in connection therewith, viscosity measurements were made at 2 rpm and 20 rpm and are expressed as $V_2$ and $V_{20}$ respectively.

Another important feature of the suspension process of the instant invention is that the internal surfaces of the polymerization reactor are quite clean. That is to say that little or no polymer buildup occurs thereon during the course of the polymerization reaction, as is the case when making regular vinyl resin by the suspension technique. The dense particles do not agglomerate, as a rule. What buildup that might occur, using the present process, is not of the difficult-to-remove hard crusty type and can readily be removed by rinsing or hosing down with water and without opening the reactor when appropriate spray nozzles are installed in the reactor. However, if need be, even this small amount of buildup can be controlled by various known methods, such as by applying an appropriate coating to the reactor surfaces, or by keeping the walls of the reactor cool during the polymerization reaction, and the like. Operating with a clean reactor, as in the present invention without the aid of assistants in this regard, is a distinct advantage in view of recently promulgated Governmental regulations with respect to the emission to the atmosphere of detrimental chemical materials.

To further illustrate the present invention, the following specific examples are given, it being understood that this is merely intended in an illustrative and not a limitative sense. In the examples, all parts and percents are by weight unless otherwise indicated.

EXAMPLE I

In this Example, polyvinyl chloride (PVC) was produced in 3 different runs in a 30 gallon reactor using the following recipe in each run:

Vinyl chloride: 100 parts
Water (demineralized): 240 parts
Polyvinyl alcohol (72.5% PVA): 1.0 part
Alcohol $C_{12}+C_{18}$: 0.5 part
Lauroyl peroxide: 0.25 part These runs were identified as 1, 2 and 3 with run No. 1 being the control. The procedure employed in each run was as follows:

No. 1. First the water was added to the reactor and the agitation started. Then the 72.5% PVA was added followed by the alcohol and lauroyl peroxide with continued agitation. Finally, the vinyl chloride was charged and the reaction mixture was agitated at 300 rpm. The temperature of the reaction medium was then raised to the polymerization temperature of 60° C. and the reaction continued until the pressure drop. The reaction was then stopped and the polymer slurry was removed from the reactor, washed and dried, in the usual manner.

No. 2. The water was added to the reactor and the agitation started (300 rpm). Then the 72.5% PVA was added followed by the alcohol. Thereafter, the vinyl chloride was charged and the reaction mixture was heated to the polymerization temperature of 60° C. The mixture was agitated for a few minutes at 300 rpm and 60° C. and then the catalyst, lauroyl peroxide, was charged. The reaction was continued until pressure drop and the polymer recovered as in No. 1.

No. 3. The same charging procedure was used as in No. 2 except that agitation was at 400 rpm. After heating the reaction mixture to 60° C. the same was agitated at 400 rpm. for 60 minutes, prior to charging the catalyst. After charging the lauroyl peroxide, the agitator was run at 400 rpm for the first 30 minutes of the reaction. Then the agitation was reduced to 300 rpm and held there until pressure drop. The reaction time was about 8-9 hours. The polymer was recovered, as in No. 1 and No. 2.

All three resins or polymers were tested and the results are in Table I below. In order to determine RVF viscosity, a plastisol was made with each of the three PVC resins and a regular 1 micron PVC blended therewith, in accordance with the following recipe:

PVC (EX. I): 70 parts
Regular PVC (1 micron): 30 parts
Dioctyl Phthalate: 57 parts
Epoxidized soybean oil: 3 parts
Ba-Zn phosphite stabilizer: 2 parts The resin and plastisol properties are given in the following table. Under the item "Vinyl Dispersion Gauge (break)" this is a test designated by the "Society For Plastics Institute" as SPI-VD-T10 and entitled "Procedure for determination of the degree of dispersion of vinyl dispersions using the precision vinyl dispersion gauge." The figures are expressed in microns and the "break" is the point at which specks appear having the micron size indicated. These appear as streaks in the plastisol.

TABLE I

| RUN NO. | 1. | 2. | 3. |
|---|---|---|---|
| RESIN PROPERTIES | | | |
| Bulk density (gm./cc) | 0.58 | 0.76 | 0.70 |
| Average particle density | 1.30 | 1.31 | 1.22 |
| Volume fraction voids | 0.07 | 0.07 | 0.131 |
| Packing fraction | 0.45 | 0.58 | 0.58 |
| Porosity (cc/gm.) | 0.108 | 0.022 | 0.042 |
| $d_{50}$ (microns) | 26 | 37 | 16 |
| PLASTISOL PROPERTIES | | | |
| Brookfield Viscosity | | | |
| Initial $V_2$ | 40,000 | 1,500 | 7,500 |
| $V_{20}$ | 29,000 | 1,550 | 3,650 |
| 1 Day $V_2$ | 70,000 | 2,000 | 7,000 |
| $V_{20}$ | 53,000 | 2,250 | 4,250 |
| 7 Days $V_2$ | 50,000 | 2,000 | 7,500 |
| $V_{20}$ | 38,000 | 2,100 | 5,250 |
| Severs Efflux-gr./100 sec., 95 psi., 0.156 cm. orifice | | | |
| 1 Day | 11.0 | 139.0 | 96.5 |
| Vinyl dispersion guage (break) microns | Not run | 150 | 30 |

The above table clearly shows the beneficial aspects of the present invention. The vinyl dispersion gauge is excellent since the lower figure is the best. The average particle size is excellent since it is far below the control (No. 1) and the second run where agitation ramping was not employed.

While the present invention has been described in terms of its specific embodiments, certain modifications and equivalents will be apparent to those skilled in the art and are intended to be included within the scope of the present invention, which is to be limited only by the reasonable scope of the appended claims.

We claim:

1. A suspension polymerization process for producing homopolymers of vinyl halides and vinylidene halides and copolymers thereof with one or more vinylidene monomers having at least one terminal $CH_2=C<$ grouping comprising, forming a monomer reaction mixture containing the monomer(s) to be polymerized, the aqueous reaction medium, a polyvinyl alcohol suspending agent, and from about 0.1% to about 1.5% by weight, based on the weight of the monomer(s), of a nonionic and substantially water-insoluble surfactant having a hydrophile-lipophile balance of less than about 3.5, agitating said reaction mixture to form suspended droplets of monomer in the mixture, heating said mixture to the polymerization temperature in the range of about 30° C. to about 70° C., agitating said mixture at said temperature for a period in the range of about 1 minute to about 60 minutes at about 100 to about 450 rpm., adding from about 0.01% to about 0.50% by weight, based on the weight of the monomer(s), of an oil-soluble free-radical yielding catalyst to said heated agitated reaction mixture and continuing said agitation at said rpm. for a period of about ¼ to about 2 hours as the first stage, then reducing the rpm. to about 50 to about 300 rpm. as the second stage, said rpm. in the second stage being less than that in the first stage, thereby forming an aqueous slurry of dense, spherical and glassy polymer particles having a diameter in the range of about 10 to about 100 microns, and thereafter recovering said particles from said slurry.

2. A process as defined in claim 1 wherein the monomer in the reaction mixture is vinyl chloride.

3. A process as defined in claim 1 wherein the catalyst is lauroyl peroxide.

4. A process as defined in claim 1 wherein the polyvinyl alcohol is hydrolyzed polyvinyl acetate having a degree of hydrolysis in the range of about 65% to about 85%.

5. A process as defined in claim 1 wherein the surfactant is a mixture of $C_{12}$ and $C_{18}$ alcohols.

6. A process as defined in claim 1 wherein the polyvinyl alcohol is 72.5% hydrolyzed polyvinyl acetate.

7. A process as defined in claim 1 wherein the polymerization temperature is 60° C.

8. A process as defined in claim 1 wherein the maximum conversion of monomer(s) to polymer is 10% in the first stage.

9. A process as defined in claim 8 wherein the monomer is vinyl chloride.

10. A process as defined in claim 9 wherein the polyvinyl alcohol is 72.5% hydrolyzed polyvinyl acetate.

11. A process as defined in claim 10 wherein the polymerization temperature is 60° C.

12. A process as defined in claim 11 wherein the catalyst is lauroyl peroxide.

13. A process as defined in claim 1 wherein the catalyst is di(2-ethyl hexyl)peroxydicarbonate.

* * * * *